(12) United States Patent
Semenov et al.

(10) Patent No.: US 6,316,904 B1
(45) Date of Patent: Nov. 13, 2001

(54) SPEED AND ROTOR TIME CONSTANT ESTIMATION FOR TORQUE CONTROL OF AN INDUCTION MOTOR

(75) Inventors: Sergey Gennadievich Semenov, St. Petersburg (RU); Alexander Timofeevich Zaremba, Dearborn Heights, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/603,937

(22) Filed: Jun. 27, 2000

(51) Int. Cl.$^7$ ...................................................... H02P 5/40
(52) U.S. Cl. .......................... 318/727; 318/804; 318/805; 318/806
(58) Field of Search .................................... 318/727, 798, 318/811

(56) References Cited

U.S. PATENT DOCUMENTS

| | | | |
|---|---|---|---|
| 4,445,080 | * 4/1984 | Curtiss | 318/798 |
| 4,926,105 | * 5/1990 | Mischenko et al. | 318/800 |
| 4,962,339 | * 10/1990 | Schauder | 318/798 |
| 5,032,771 | * 7/1991 | Kerkman et al. | 318/52 |
| 5,272,429 | * 12/1993 | Lipo et al. | 318/808 |
| 5,334,923 | * 8/1994 | Lorenz et al. | 318/805 |
| 5,476,158 | 12/1995 | Mann et al. | 187/289 |
| 5,510,689 | * 4/1996 | Lipo et al. | 318/809 |
| 5,541,488 | * 7/1996 | Bansal et al. | 318/801 |
| 5,594,670 | 1/1997 | Yamamoto | 364/571.01 |

(List continued on next page.)

OTHER PUBLICATIONS

Bondarko et al, "Speed and Flux Estimation for an Induction Motor Without Position Sensor", Proc. Amer. Contr. Conf., San Diego, CA, Jun. 1999.

Matsuo et al, "A Rotor Parameter Identification Scheme for Vector–Controlled Induction Motor Drives", IEEE Transaction on Industry Applications, vol. IA–21, No. 4, May/Jun. 1985.

Kubota et al, "Speed Sensorless Field–Oriented Control of Induction Motor with Rotor Resistance Adaptation", IEEE Transactions on Industry Applications, vol. 30, No. 5, 1994.

Aloliwi et al, "Robust Speed Control of Induction Motors Using Adaptive Observer", Proc. Amer. Contr. Conf., pp. 931–935, San Diego, CA, Jun. 1999.

Shishkin et al, "Discrete–Time Method for Robust Global Stabilization of Induction Motor", Proc. Amer. Contr. Conf., San Diego, CA, Jun. 1999.

Zheng et al, "Adaptive Flux and Speed Estimation for Induction Motors", Proc. Amer. Contr. Conf., San Diego, CA, Jun. 1999.

Leonard, "Control of Electrical Drives", Springer, 2nd Edition, 1996.

(List continued on next page.)

Primary Examiner—Robert E. Nappi
Assistant Examiner—Rita Leykin
(74) Attorney, Agent, or Firm—Jennifer Stec

(57) ABSTRACT

A speed sensorless controller for an induction motor with rotor resistance estimation, using stator currents and voltages. The rotor resistance and speed estimation are obtained as a solution of a linear algebraic system with pseudo current and voltage signals and their observable derivatives as inputs. The proposed scheme provides accurate, real-time estimation of the speed and rotor time constants in all motor operational modes. It can also be used for real-time motor tuning if a speed signal is available.

6 Claims, 11 Drawing Sheets

U.S. PATENT DOCUMENTS

| | | | |
|---|---|---|---|
| 5,729,113 | 3/1998 | Jansen et al. | 318/799 |
| 5,796,236 * | 8/1998 | Royak | 318/804 |
| 5,903,129 | 5/1999 | Okuno et al. | 318/721 |
| 6,008,618 | 12/1999 | Bose et al. | 318/811 |
| 6,014,006 | 1/2000 | Stuntz et al. | 318/804 |

OTHER PUBLICATIONS

Novotny et al, "Vector Control and Dynamics of AC Drives", Clarendon Press, Oxford, 1996.

Zaremba et al, "Active Damping of Engine Speed Oscillations Based on Learning Control", Proc. Amer. Contr. Conf., Philadelphia, PA, 1998.

Zaremba et al, "Performance and Control Issues in an Electric Power Steering System", Proc. Amer. Contr. Conf., Philadelphia, PA, 1998.

Davis, "Engine and Vehicle Model for Starter/Alternator Active Flywheel Development", Ford Technical Report, SRR–1998–0048, 1998.

* cited by examiner

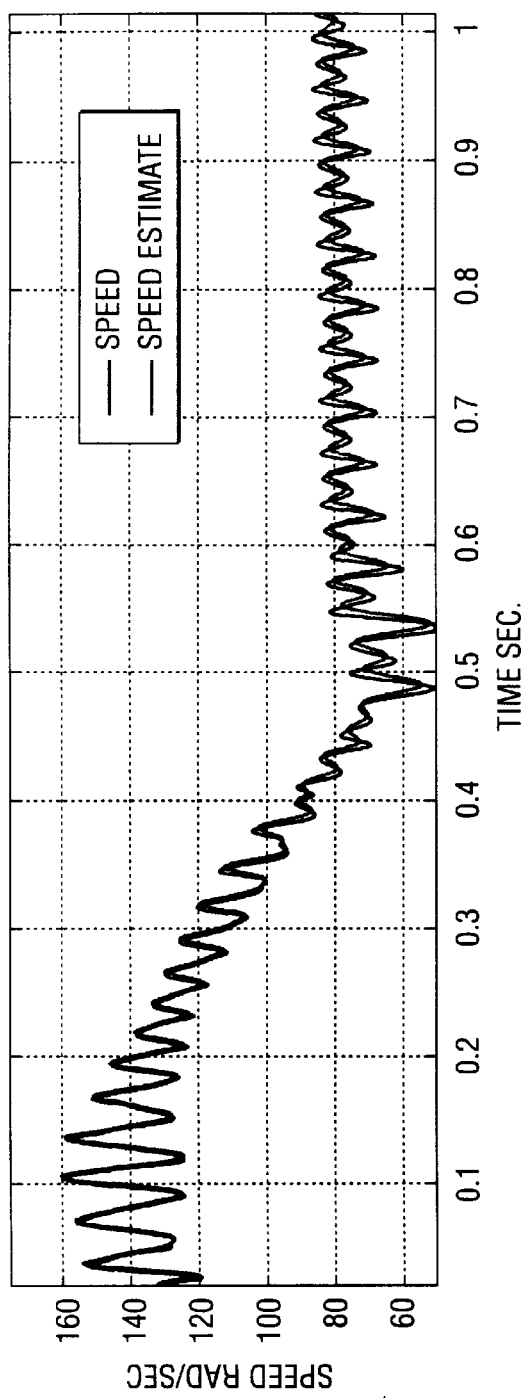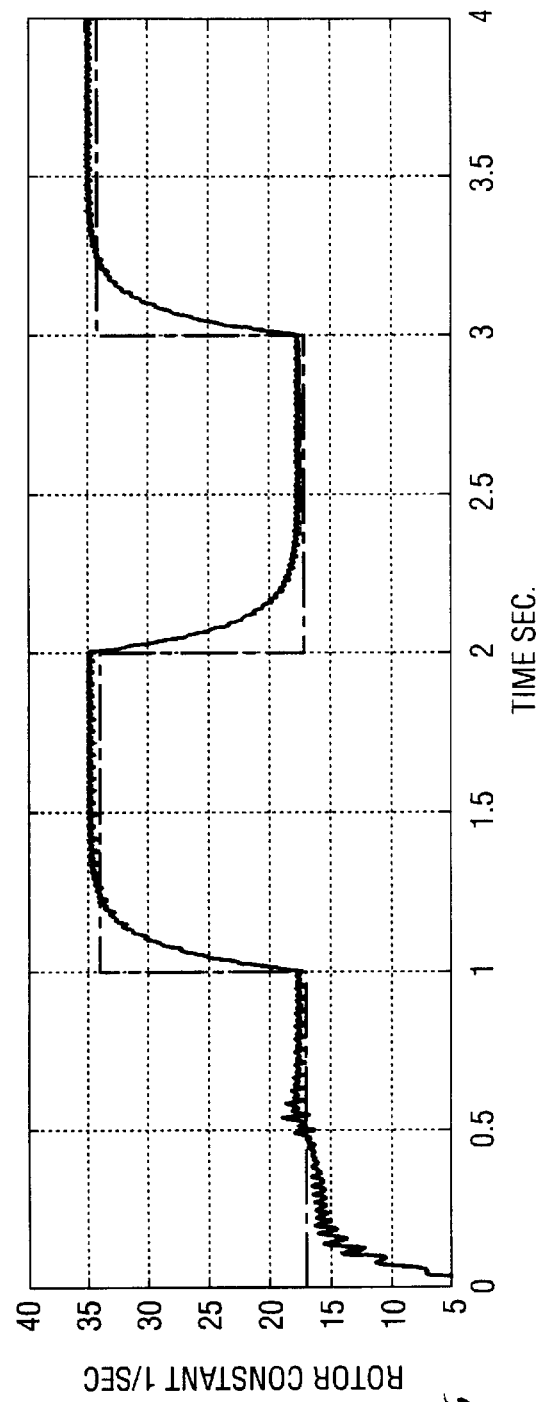
Fig. 4a
Fig. 4b

SPEED AND ROTOR TIME CONSTANT ESTIMATION FOR TORQUE CONTROL OF AN INDUCTION MOTOR

TECHNICAL FIELD

The invention relates to powertrains having an electric induction motor, including hybrid powertrains that include an internal combustion engine.

BACKGROUND ART

U.S. Pat. No. 6,014,006 discloses a method for controlling torque output for an electric induction motor using estimations of rotor flux angle and rotor speed. The speed is estimated based on motor dynamics represented by equations for which the speed is a control variable to be estimated, the other variables being measurable. Rotor flux is estimated directly from rotor speed using a set of motor control equations, and rotor flux angle is determined from rotor flux for controlling motor torque.

The accuracy of speed estimation of an induction motor without rotational transducers can be affected by rotor resistance variation during operation.

A rotor parameter identification technique for the purpose of updating control gains of an induction motor vector controller by introducing a separate high frequency carrier signal is described by Matsuo et al in a paper entitled "A Rotor Parameter Identification Scheme For Vector-Controlled Induction Motor Drives", (IEEE Transactions On Industry Applications, Vol. IA-21, No. 4, May/June 1985). An adaptive scheme for simultaneous speed and rotor resistance identification derived by using Lyapunov's function is analyzed by Kubota et al in a paper entitled "Speed Sensorless Field-Oriented Control of Induction Motor with Rotor Resistance Adaptation" (IEEE Transactions on Industry Applications, Vol. 30, No. 5, 1994). The approach of Kubota et al is implemented by superimposing AC components on the field current command.

Robust nonlinear control of the speed of induction motors that uses measurements of the rotor position and stator current with on-line adaptation of the rotor resistance is described by Aloliwi et al in a paper entitled "Robust Speed Control of Induction Motors Using Adaptive Observer" (Proceedings of American Control Conference, pp. 931–935, June 1999). A paper written by Shishkin et al entitled "Discrete-Time Method for Robust Global Stabilization of Induction Motor" (Proceedings of American Control Conference, 1999), describes how the rotor resistance is updated at a prescribed instant by minimizing a nonlinear scalar function, which is monotonic and has a well defined solution when ω and/or load are small.

Zheng et al describe in a paper entitled "Adaptive Flux and Speed Estimation for Induction Motors" (Proceedings of American Control Conference, June 1999), an adaptive estimator for rotor resistance that considers the rotor speed and rotor resistance as slowly varying unknown parameters of a model reference adaptive system. Under persistent excitation, it is explained by Zheng et al that estimated flux and rotor speed converge to their true values.

A paper by Bondarko and Zaremba (one of the inventors of the present invention), entitled "Speed and Flux Estimation for an Induction Motor Without Position Sensor" (Proceedings of American Control Conference, June 1999) describes a speed sensorless torque control of an induction motor.

DISCLOSURE OF INVENTION

The rotor resistance observer used in the present invention is a further development of the approach, mentioned above, for speed sensorless torque control of electric motors. By assuming that rotor resistance and speed variation are slow, compared to flux and current changes, a linear algebraic system is developed with rotor resistance and speed being the only unknown parameters. The inputs to the observer are pseudo current and pseudo voltage signals and their observable derivatives. The rotor resistance and speed observer is complemented with an accurate, discrete time flux observer, which is based on an analytical solution of the rotor flux equation over a sampling interval. Knowing flux estimation, a standard field orientation control technique is applied.

The method and strategy of the invention provides estimates of rotor resistance and speed for motor torque control by computing a rotor slip gain as a function of measurable stator current and voltage, computing orientation and magnitude of rotor flux as a function of stator current, estimated speed and rotor slip gain, computing rotor slip speed as a function of slip gain and calculating electrical rotor speed as a function of the number of pole pairs, estimated rotor speed and rotor slip speed.

BRIEF DESCRIPTION OF DRAWINGS

FIG. 4a is a plot of motor rotor speed estimation versus time;

FIG. 4b is a plot of motor rotor constant estimation for a step rotor resistance function;

BEST MODE FOR CARRYING OUT THE INVENTION

The dynamic model of an induction machine with a stationary stator is as follows:

$$\frac{d\Theta}{dt} = \omega \quad (1)$$

$$\frac{d\omega}{dt} = -\frac{3}{2}\frac{n_p M}{mL_r}\lambda_r^T J i_s - T_L/m \quad (2)$$

$$\frac{d\lambda_r}{dt} = \left(-\frac{R_r}{L_r}I + n_p\omega J\right)\lambda_r + \frac{R_r}{L_r}Mi_s \quad (3)$$

$$\frac{di_s}{dt} = -\frac{M}{\sigma L_s L_r}\left(-\frac{R_r}{L_r}I + n_p\omega J\right)\lambda_r - \frac{1}{\sigma L_s}\left(R_s + \frac{M^2 R_r}{L_r^2}\right)i_s + \frac{1}{\sigma L_s}v_s \quad (4)$$

$$\text{where } I = \begin{pmatrix} 1 & 0 \\ 0 & 1 \end{pmatrix}, J = \begin{pmatrix} 0 & -1 \\ 1 & 0 \end{pmatrix}.$$

Here, the variables $\Theta$ and $\omega$ are, respectively, the angular position and speed of the rotor; and $\lambda_r$, $i_s$ and $v_s$ are rotor flux, stator current and voltage in the stator frame $(\alpha,\beta)$, respectively.

The parameters $R_r$ and $R_s$ are the rotor and stator resistances, M is the mutual inductance, $L_r = M + L_{lr}$ and $L_s = M + L_{ls}$ are the rotor and stator inductances, $\sigma = 1 - M^2/L_s L_r$ is the leakage parameter, m is the moment of inertia of the motor, $n_p$ is the number of pole pairs, and $T_L$ is an external torque load.

Figure 1:
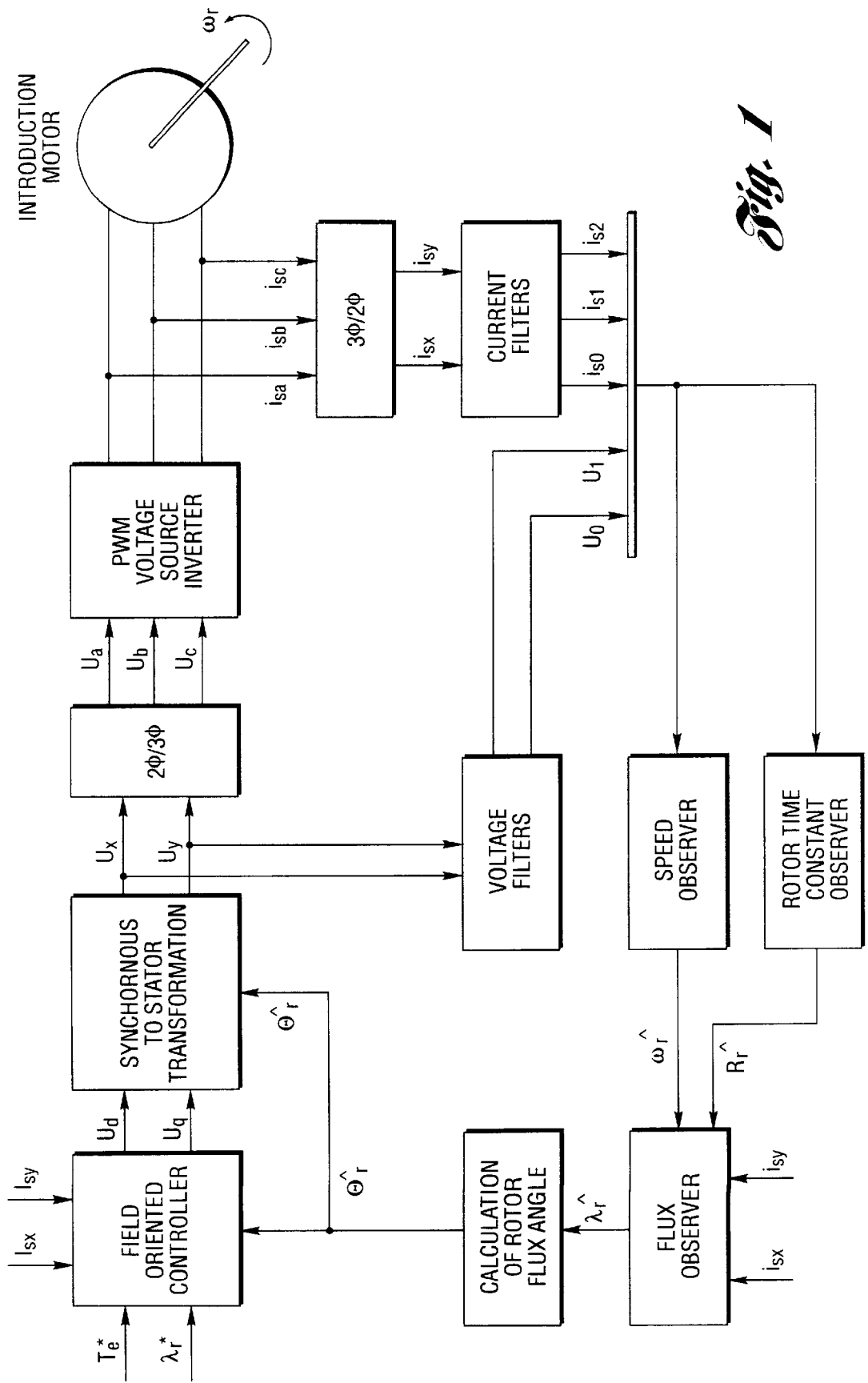
FIG. 1 is a schematic block diagram of the speed sensorless torque control system of the invention, wherein rotor resistance is estimated.

For vector control of the induction motor, it is necessary to measure or estimate the orientation of the rotor flux, which allows separation of the problems of flux control and reference torque tracking. The speed sensorless field orientation control scheme of the induction motor, which includes rotor speed, rotor resistance and rotor flux observers, is shown in FIG. 1. The rotor resistance and rotor speed observer uses pseudo voltage and pseudo current signals as inputs, and the rotor flux observer provides information about electrical field angle to a field orientation controller. In the field orientation block, the current is regulated in a rotor flux related reference system around the reference values:

$$i_{ds}^* = \frac{\lambda_{dr}^* + \tau_r \dot{\lambda}_{dr}^*}{M} \text{ and} \quad (5)$$

$$i_{qs}^* = \frac{2}{3n_p}L_r\frac{T_{ref}^*}{M\lambda_{dr}^*}, \quad (6)$$

where $T^*_{ref}$ and $\lambda^*_{dr}$ are the reference values of torque and rotor flux.

An observer for rotor speed and rotor resistance using only the stator current and voltage signals will be described in the following text.

In the design of the speed and rotor resistance observer, the observer design is based on a technique for speed sensorless torque control of an electric motor. The motor dynamic equations (3) and (4) can be rewritten as follows:

$$\frac{di_s}{dt} = -\gamma i_s + \beta A \lambda_r + \delta u, \quad (7)$$

$$\frac{d\lambda_r}{dt} = A\lambda_r + nMi_s, \text{ where} \quad (8)$$

$$A = \begin{pmatrix} \eta & \omega_r \\ -\omega_r & \eta \end{pmatrix} = \eta I - \omega_r J, \quad (9)$$

and $\omega_r = \eta_p \omega$ (rotor electrical speed).

Differentiating (7) and eliminating $\lambda_r$ results in the following:

$$\frac{d^2 i_s}{dt^2} + \gamma\frac{di_s}{dt} - \delta\frac{du}{dt} = \eta\left\{(\beta\eta M - \gamma)i_s - \frac{di_s}{dt} + \delta\mu\right\} - \quad (10)$$

$$\omega_r J\left\{(\beta\eta M - \gamma)i_s - \frac{di_s}{dt} + \delta\mu\right\}.$$

Equation (10) can be represented as follows:

$$a + Jb \cdot \omega_r = 0 \quad (11)$$

where a and b are 2-vectors:

$$a = \left\{\frac{d^2}{dt^2} + (\gamma + \eta)\frac{d}{dt} - \eta(\beta\eta M - \gamma)\right\}i_s - \delta\left\{\frac{d}{dt} + \eta\right\}u, \quad (12)$$

$$b = \left\{-\frac{d}{dt} + (\beta\eta M - \gamma)\right\}i_s - \delta u. \quad (13)$$

Observing that Equations (12) and (13) are linear with respect to rotor time constant $\eta$, Equation (10) is transformed to:

$$a' + Jb \cdot \omega_r - \eta b = 0, \text{ where} \quad (14)$$

$$a' = \left\{\frac{d^2}{dt^2} + \gamma\frac{d}{dt}\right\}i_s - \delta\frac{d}{dt}u. \quad (15)$$

Thus, second order linear algebraic system (14) with respect to $\omega_r$ and $\rho$ is obtained. The solution of system (14) is given by the following formulas:

$$\omega_r = \frac{b'Ja'}{|b|^2}, \text{ and} \quad (16)$$

$$\eta = \frac{b'a'}{|b|^2}. \quad (17)$$

Equations (16) and (17) contain derivatives of the current and voltage signals and cannot be used directly to determined rotor speed and rotor time constant. Following the teachings in the paper of Bondarko and Zaremba mentioned in the preceding background art discussion, the filtered versions of the current and voltage signals are introduced as follows:

$$\left(\frac{d}{dt} + G\right)^2 i_{s0} = i_s, \left(\frac{d}{dt} + G\right)^2 u_0 = u, \quad (18)$$

where filter constant G>0.

These lead to the following speed and rotor time constant observer:

$$\hat{\omega}_r = \frac{b'_G Ja'_G}{|b_G|^2} \quad (19)$$

$$\hat{\eta} = \frac{b'_G a'_G}{|b_G|^2}, \quad (20)$$

where $$a'_G = i_{s2} + \gamma i_{s1} - \delta u_1 \quad (21)$$

$$b_G = -i_{s1} + \delta R_s i_{s0} + \delta u_0. \quad (22)$$

The derivatives $$i_{s1} = di_{s0}/dt, \ i_{s2} = d^2 i_{s0}/dt^2, \ u_{s1} = du_{s0}/dt \quad (23)$$

now can be determined as a solution of the following equations:

$$\left(\frac{d}{dt}+G\right)^2 i_{s1} = di_s/dt, \quad (24)$$

$$\left(\frac{d}{dt}+G\right)^2 u_1 = du/dt,$$

The observers (19) and (20) are well defined and have only a singular point, $b_G=0$, when electrical excitation frequency is equal to zero ($\omega_e=0$). But from (21) it follows that vector $a'_G$ has a slight dependence on $\eta$; namely, $\gamma=\delta(R_s+M^2\eta/L_r)$. Usually, the second term in brackets is small compared to $R_s$, and dependence of $\gamma$ on $\eta$ is weak. Nevertheless, Equation (14) can be modified to exclude $\eta$ from a'; i.e., $$a''+Jb\cdot\omega_r-\eta b'=0, \quad (25)$$

where $$a'' = \left\{\frac{d^2}{dt^2}+\delta R_s\frac{d}{dt}\right\}i_s - \delta\frac{d}{dt}u, \text{ and} \quad (26)$$

$$b' = \left\{-\left(1+\delta\frac{M^2}{L_r}\right)\frac{d}{dt}-\delta R_s\right\}i_s + \delta u. \quad (27)$$

The observer based on (25) is as follows:

$$\hat{\omega}_r = \frac{b'^T_G Ja''_G}{(b'_G \cdot b'_G)} \quad (28)$$

$$\hat{\eta} = \frac{b'_G \cdot a''_G}{(b'_G \cdot b'_G)}. \quad (29)$$

The analysis of the singular points for Equations (28) and (29) is more complicated. It involves also the zeros of vector (27) and the situation when vectors b and b' are orthogonal.

In the case in which the rotor speed is measurable, the rotor time constant can be estimated from (25) in a different way, i.e., $$\hat{\eta} = \frac{b'_G \cdot a''_G}{|b'_G|^2} + \omega_r\frac{b'^T_G Jb_G}{|b'_G|^2}. \quad (30)$$

The observer (30) is more robust since its denominator is positive. It includes only singularities of vector b', and it is suitable for rotor time constant adjustment during motor operation with a conventional field oriented controller.

The system model can be demonstrated in a Xmath/SystemBuild graphical environment. It includes as its main elements an engine model, emulation of the user graphical interface, and an induction motor model block. The later incorporates the speed sensor model, speed active damping controller, power limiter, field oriented controller, PWM model, induction motor model, pseudo voltage and current observers, speed and rotor time constant observer, and flux observer. The simulation was performed for speed active damping during idle conditions $\omega_m^{ref}=80$ rad/sec.

The motor parameters used in the simulation are given in the following table:

| $R_s$ | $R_r$ | M | $L_{1r}$ | $L_{1s}$ |
|---|---|---|---|---|
| 0.11 | 0.087 | 0.00081 | 0.0011 | 0.0011 |

FIG. 1 shows the overall speed sensorless control system with resistance estimation.

Figure 2:
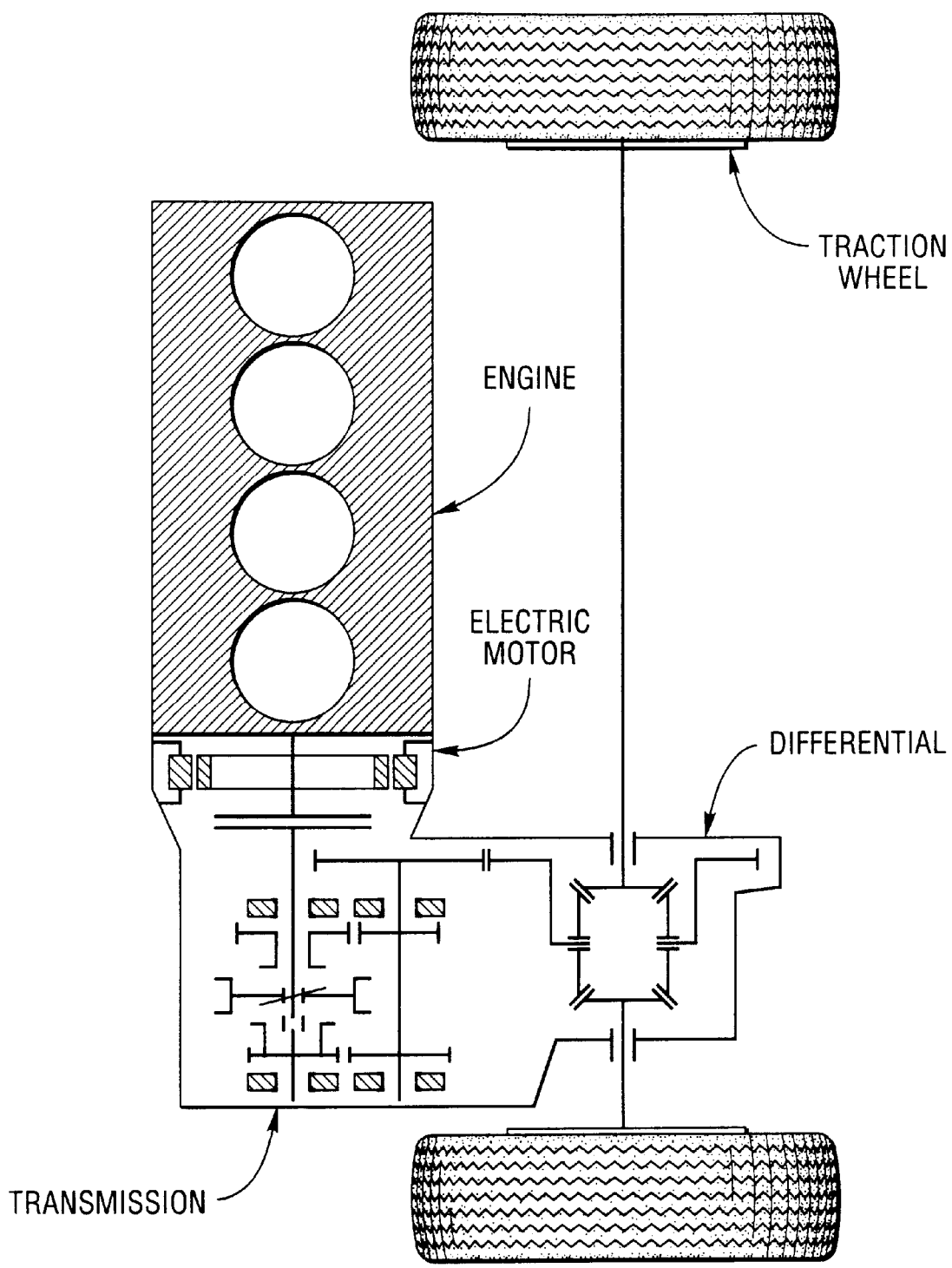
FIG. 2 is a schematic diagram of a typical automotive vehicle hybrid powertrain, including an electric motor, that can be controlled by the improved method of the invention.

The typical hardware setup is given in FIG. 2 where the starter/alternator is used as a source of additional control torque to combine propulsion function with alternator and active flywheel operation.

Figure 3A:
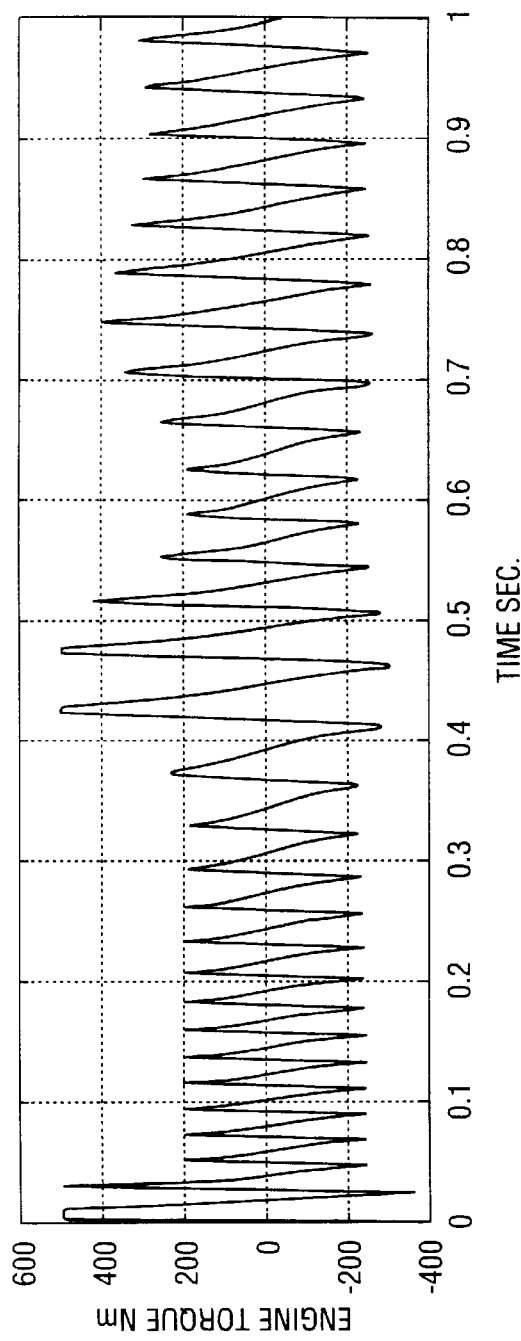
FIG. 3a is a plot of engine torque in a hybrid powertrain versus time.
Figure 3B:
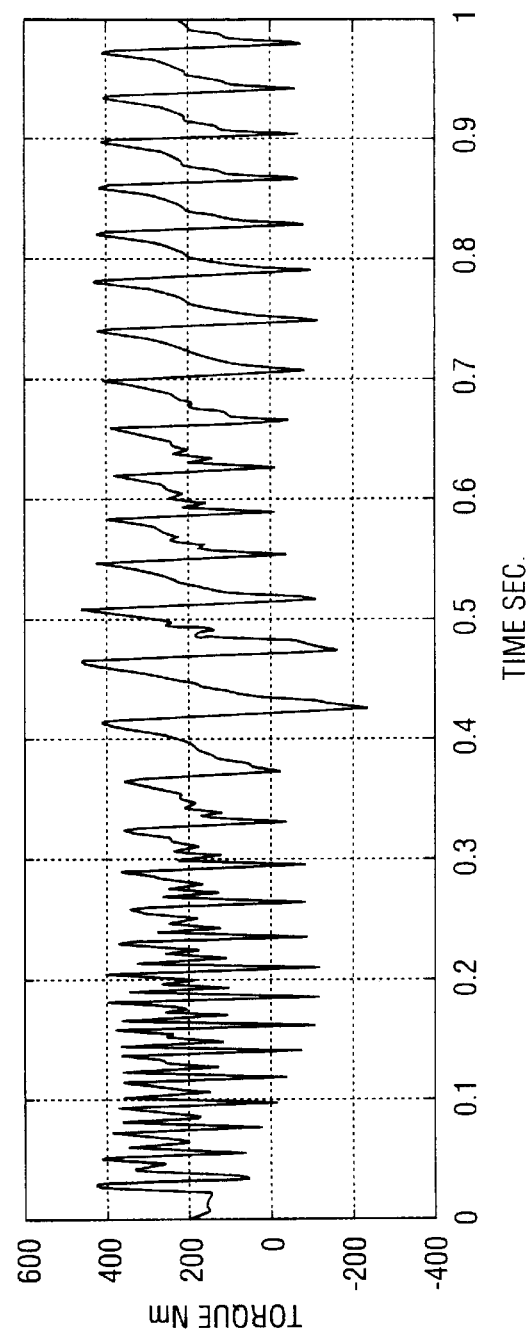
FIG. 3b is a plot of electric motor torque in a hybrid powertrain versus time.
Figure 5:
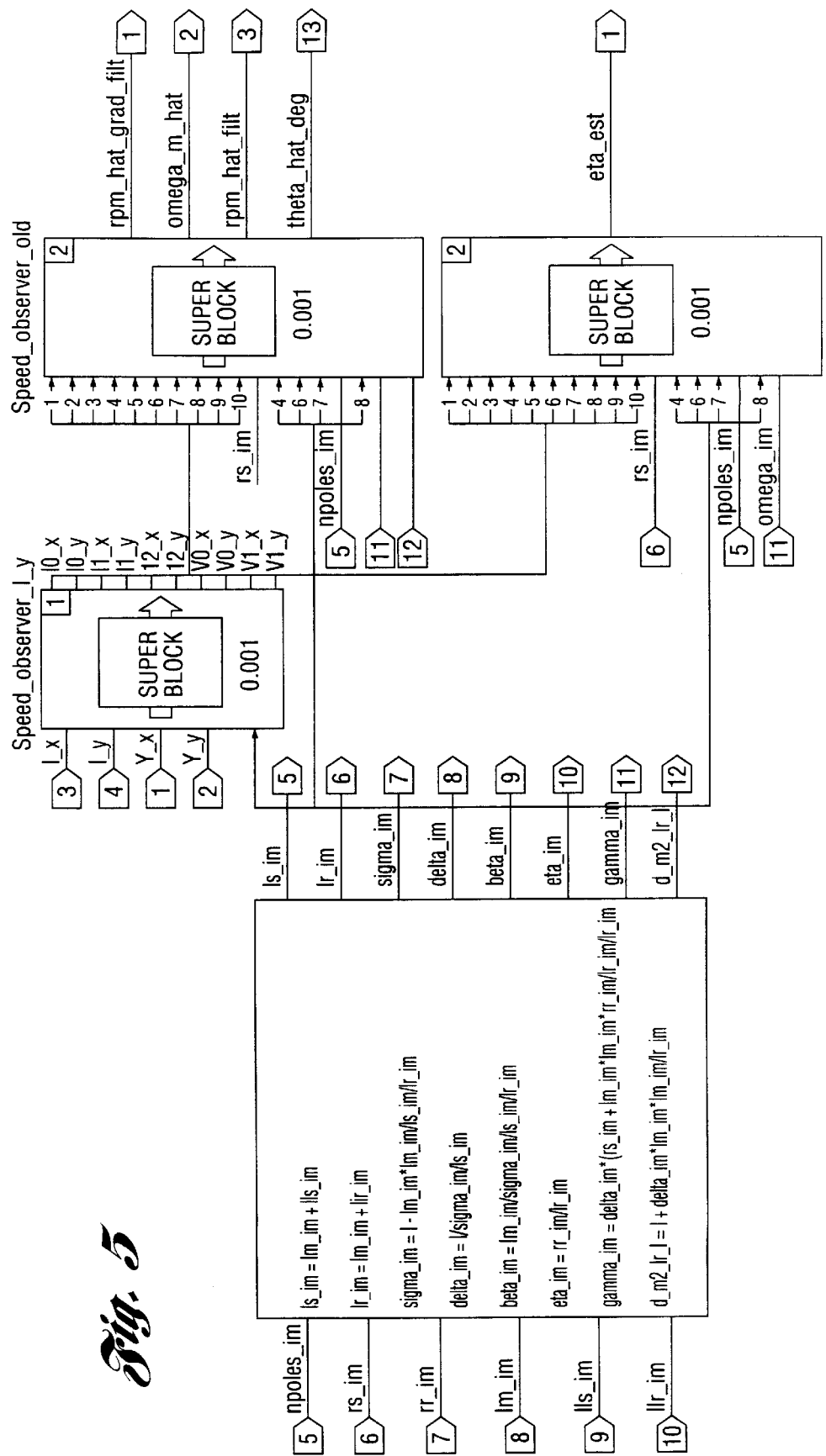
FIG. 5 is a schematic block diagram of the observer of rotor speed and resistance.
Figure 6:
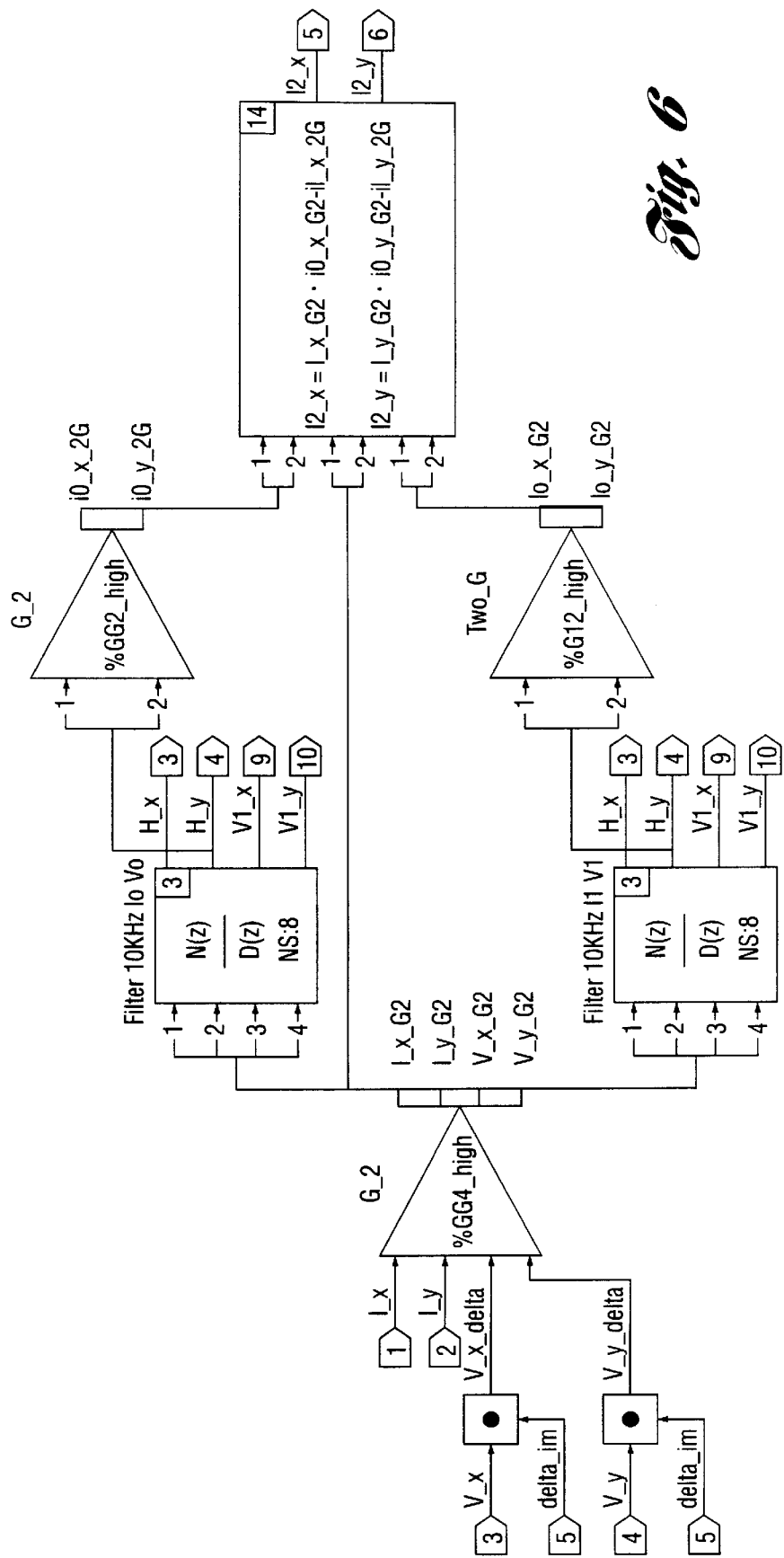
FIG. 6 is a schematic filter circuit for the motor voltage and current.
Figure 7A:
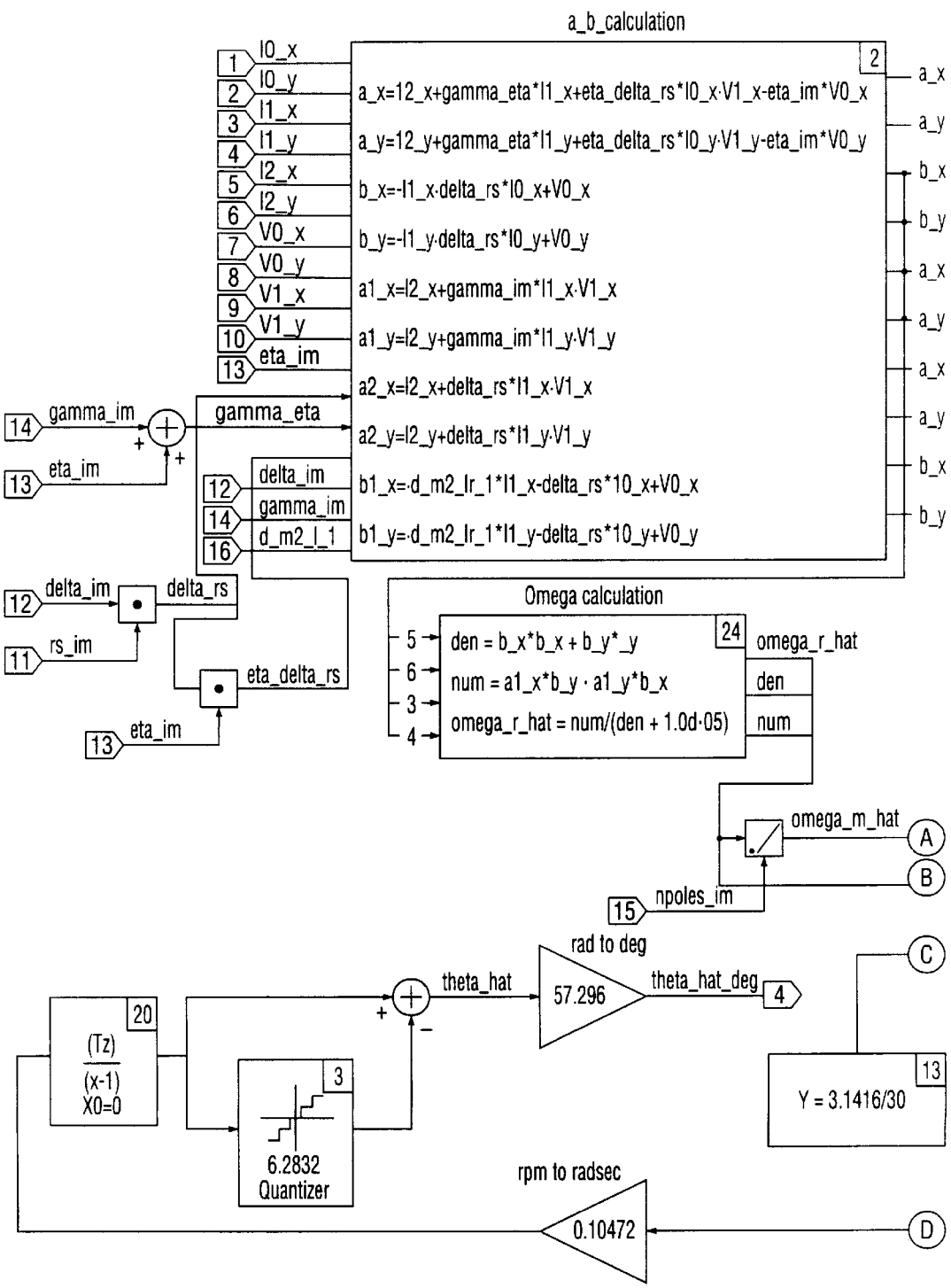
FIGS. 7a and 7b is a schematic block diagram of the rotor speed observer.
Figure 7B:
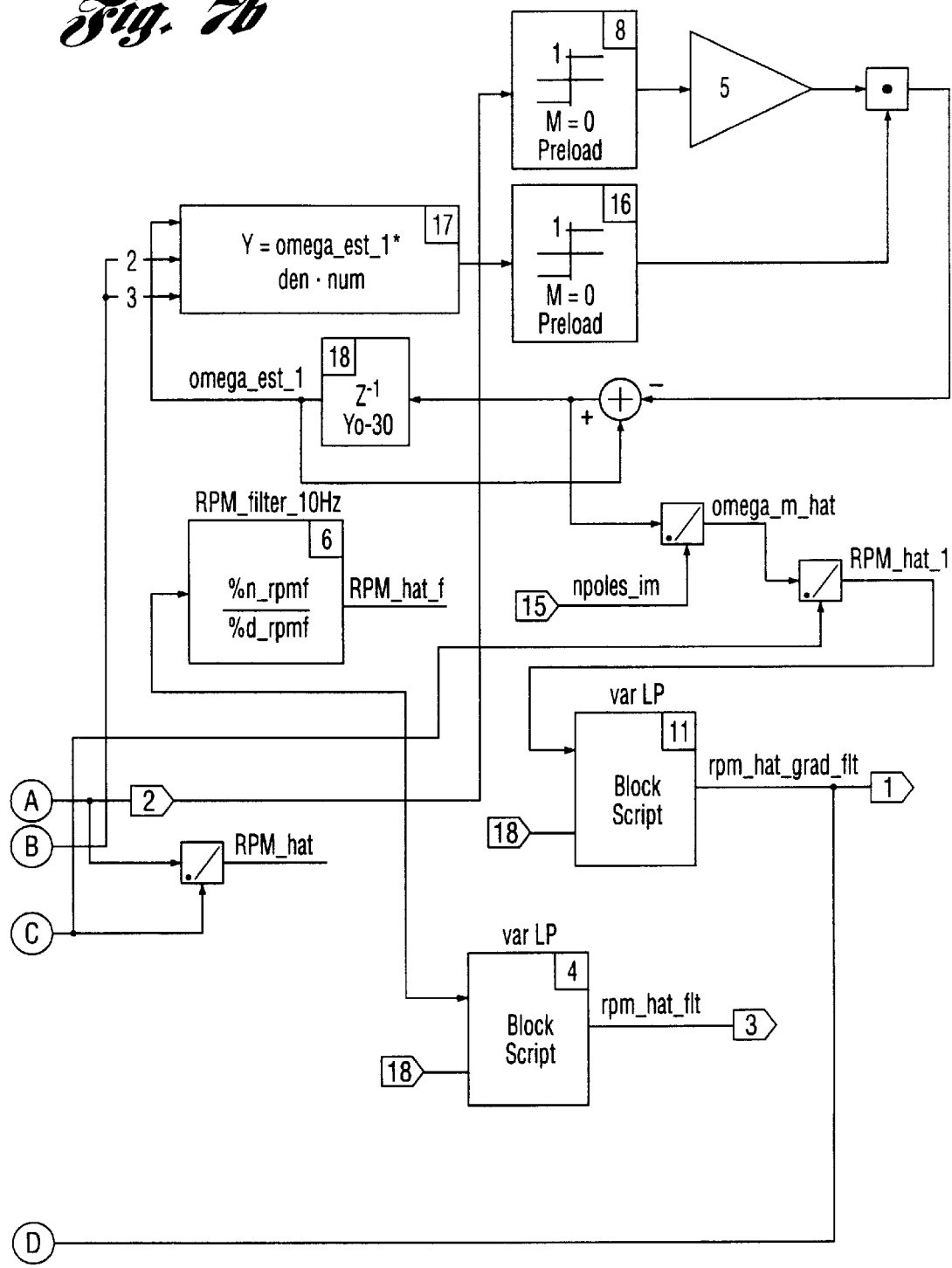
Figure 8:
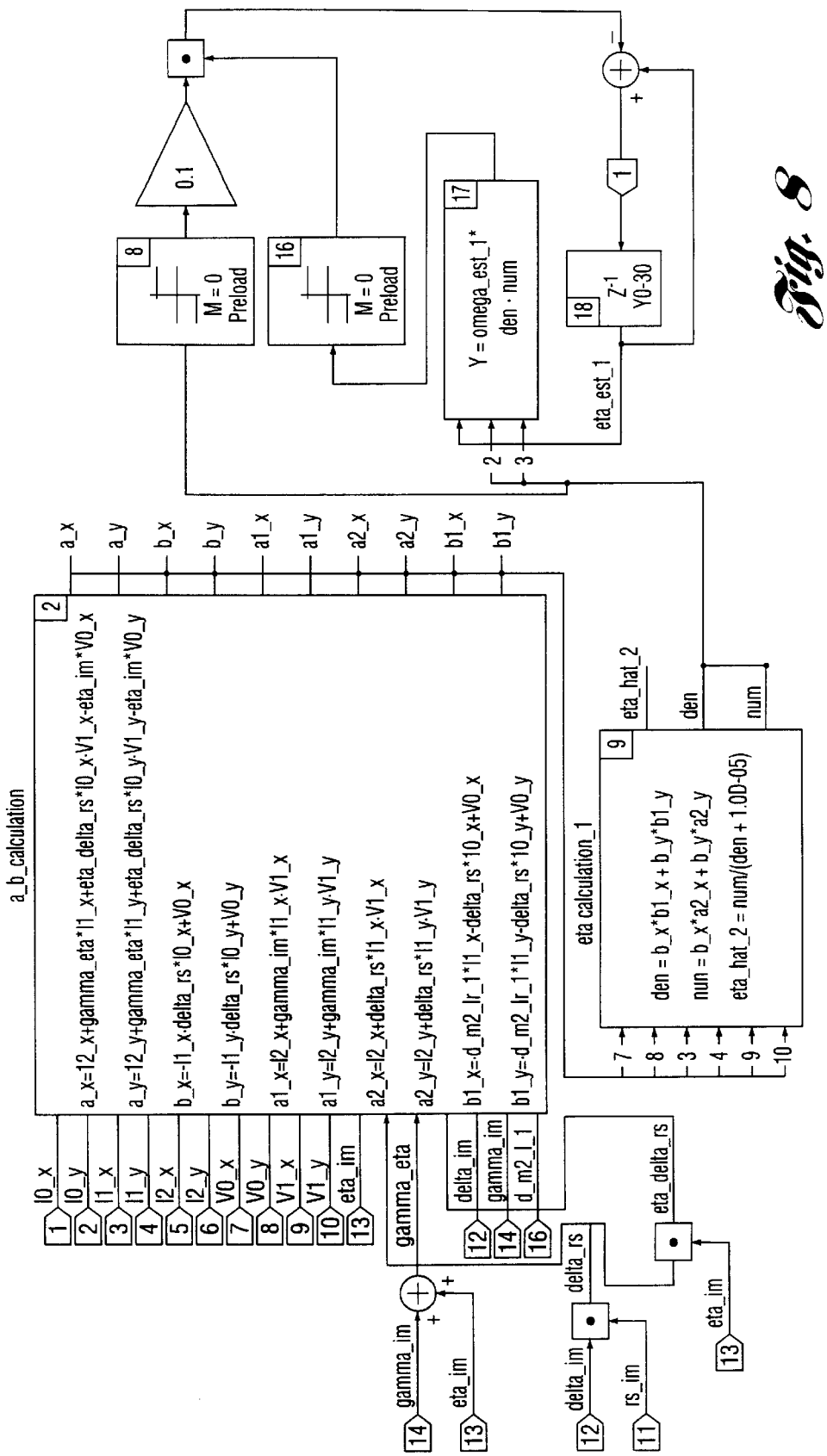
FIG. 8 is a schematic block diagram of the rotor time constant observer.

FIG. 3a shows torque generated by the engine, which may be a 2.0 L diesel engine. The plot in FIG. 3b shows the motor control torque command for active engine speed damping. The controller is a classical second order lead compensator.

FIGS. 4a and 4b show speed and rotor time constant estimation for the idle condition. After some transient, the speed is regulated around the $\omega_m^{ref}=80$ rad/sec., as seen in FIG. 4a. The speed observer filter bandwidth is selected at 100 Hz because of the noise concern; and because of this, the speed estimate lags the real value during fast speed changes, which is around 50 Hz in the case of FIG. 4a.

FIG. 4b shows rotor time constant estimation when real values of the rotor resistance are modeled as a step function with 100% variation. The estimates track the modeled values well despite heavy pulsation in speed and, consequently, in the pseudo voltage and current signals.

Additional filtering of the rotor constant estimate is selected at 2 Hz. This regulates the transient of the estimate and amplitude of pulsation at steady state conditions.

Equations (11), (25) are a basis for the observer design. Therefore, $$\hat{\omega}_r = \frac{b^T_G Ja_G}{|b_G|^2}, \hat{\eta} = \frac{b^T_G a''_G}{b^T_G b'_G}, \quad (31)$$

where $$a_G = i_{s2}+(\gamma+\hat{\eta})i_{s1}+\hat{\eta}\delta R_s i_{s0}-\delta u_{s1}-\delta\eta u_{s0}, \quad (32)$$

$$b_G = -i_{s1}-\delta R_s i_{s0}+\delta u_{s0}, \quad (33)$$

$$a''_G = i_{s2}+\delta R_s i_{s1}-\delta u_{s1}, \quad (34)$$

and $$b'_G = -\left(1+\delta\frac{M^2}{L_r}\right)i_{s1}-\delta R_s i_{s0}+\delta u_{s0}. \quad (35)$$

Due to the strong noise components they may contain during the real time motor control and the possible singularities when switching the mode of operation, the filtered rotor speed and slip gain estimates (31) are not used directly. Instead, approximations of $\omega$ and $\eta$ can be obtained using a simple gradient algorithm, $$\hat{\omega}_{n+1}=\hat{\omega}_n-\epsilon_\omega \text{sign}(D_{1n}\hat{\omega}_n-N_{1n})\text{sign}(D_{1n}), \quad (36)$$

and $$\hat{\eta}_{n+1}=\hat{\eta}_n-\epsilon_\eta \text{sign}(D_{2n}\hat{\eta}_n-N_{2n})\text{sign}(D_{2n}), \quad (37)$$

where $N_{1n}=N_1$ (n$\Delta$), $D_{1n}=D_1$ (n$\Delta$), $N_{2n}=N_2$ (n$\Delta$), $D_{2n}=D_2$ (n$\Delta$), and $$N_1 = b_G^T Ja_G, \quad (38)$$

$$D_1 = |b_G|^2, \quad (39)$$

$$N_2 = b_G^T a''_G, \quad (40)$$

$$D_2 = b_G^T b'_G. \quad (41)$$

The algorithms (36)–(37) are implemented in an Xmath/SystemBuild graphical environment and are illustrated in FIGS. 5–8. The C code is then generated by using the Xmath Autocode tool.

Figure 9A:
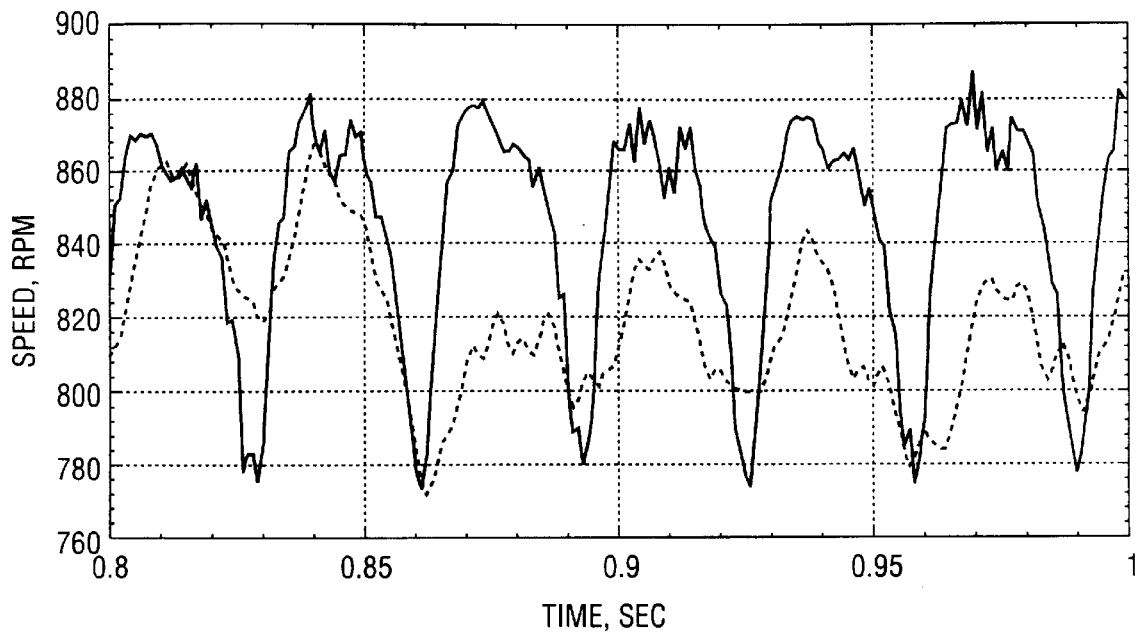
FIG. 9a is a plot of rotor speed estimation versus time.
Figure 9B:
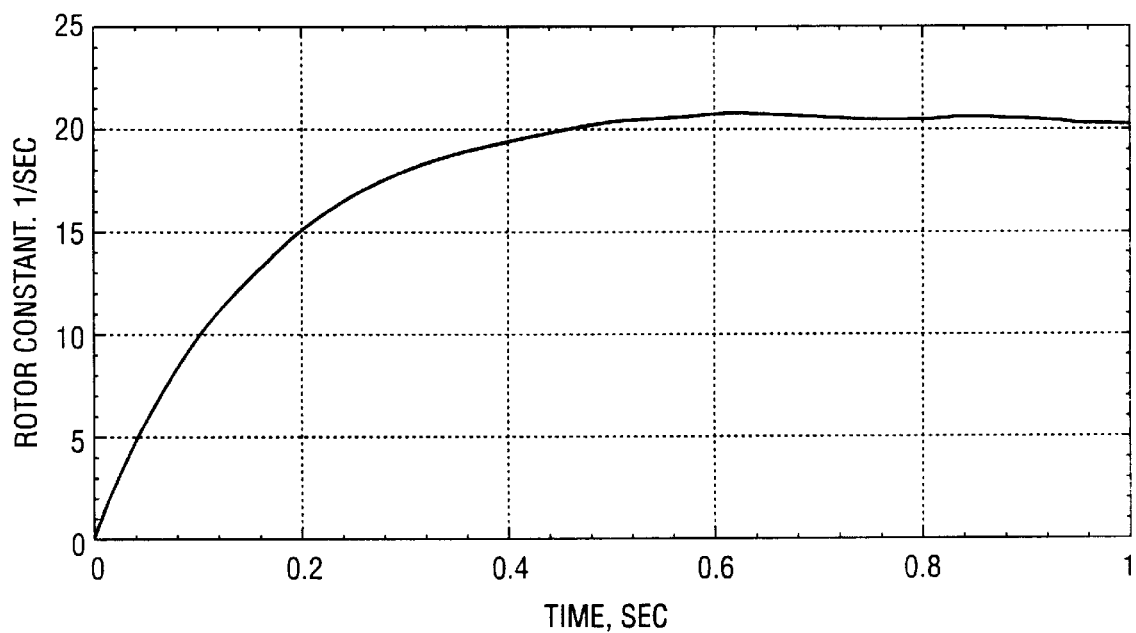
FIG. 9b is a plot of rotor constant estimation versus time.
Figure 10A:
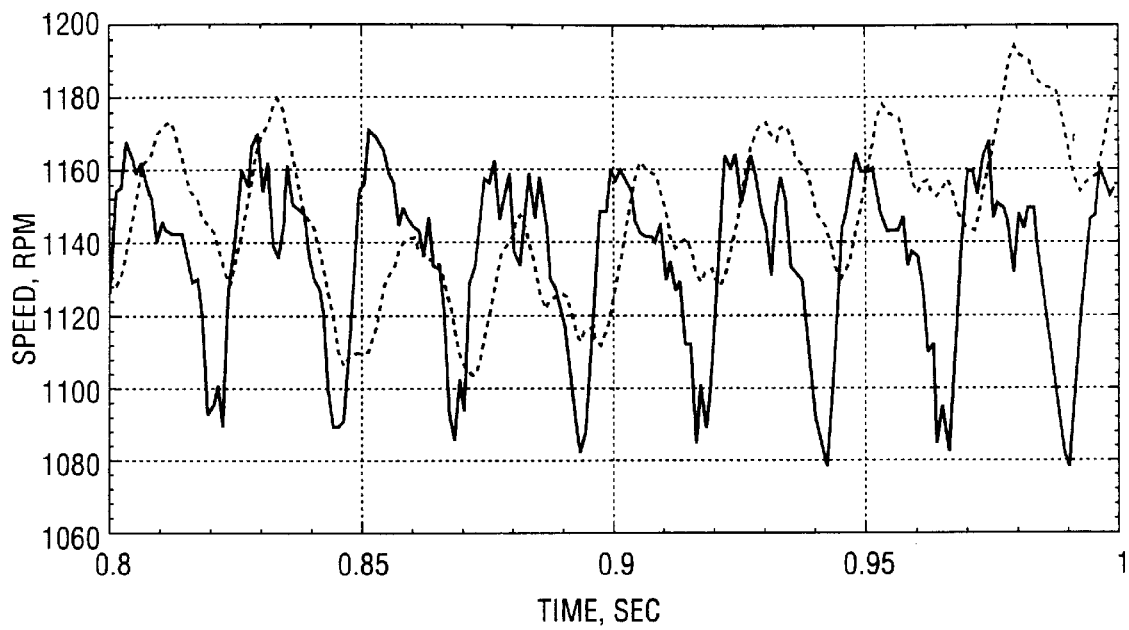
FIG. 10a is another plot of rotor speed estimation versus time with higher speed amplitude.
Figure 10B:
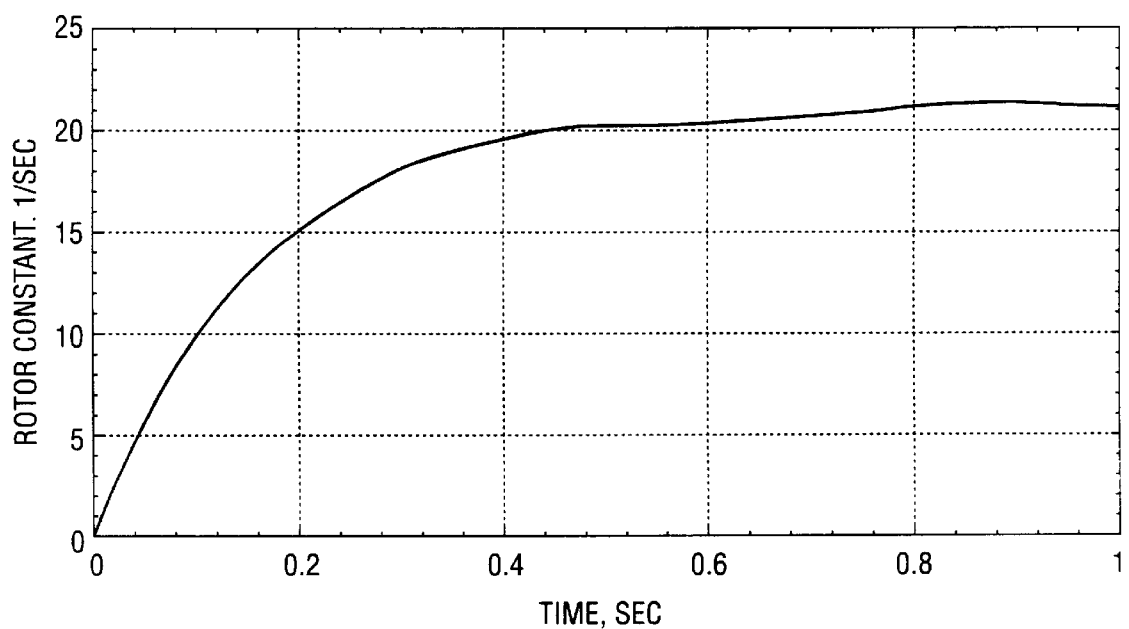
FIG. 10b is a plot of the rotor constant estimation versus time.

FIGS. 9–10 show the rotor speed pulsations due to engine combustion, but the algorithm provides reasonable quality estimates despite the original assumption that speed varies slowly. The rotor time constant estimates converge to the values that are consistent with the data of FIGS. 9–10.

In summary, the invention comprises a control strategy for torque control of an electric motor with speed and rotor time constant estimation based on pseudo current and voltage signals. The rotor time constant estimate is then obtained as a solution of a system of algebraic equations with calculated pseudo signals and their observable derivatives as inputs.

The invention provides accurate real-time estimation of the rotor time constant in a speed sensorless mode of operation. It can be also used for real-time tuning of an electric motor when a speed signal is available.

While the best mode for carrying out the invention has been described in detail, those familiar with the art to which this invention relates will recognize various alternative designs and embodiments for practicing the invention without departing from the scope of the invention. All such alternative designs and embodiments, and equivalents thereof, are intended to be within the scope of the following claims.

What is claimed is:

1. A method and strategy for estimates of rotor resistance and speed for torque control of an electric induction motor, the motor having a stationary stator with pole pairs in a frame surrounding a rotor wherein only stator current and stator voltage are measurable, the method and strategy comprising the steps of:

computing a rotor slip gain as a function of a measurable stator current and a stator voltage;

estimating rotor speed;

computing orientation and magnitude of rotor flux as a function of stator current, estimated speed and rotor slip gain; and computing a rotor slip speed as a function of slip gain;

calculating electrical rotor speed as a function of the number of pole pairs, estimated rotor speed and rotor slip speed.

2. The method and strategy set forth in claim 1 wherein slip gain is equal to rotor resistance divided by rotor inductance $\gamma$.

3. The method and strategy set forth in claim 1 wherein the estimation of rotor speed comprises the step of computing quotient of term $b_G^T Ja'_G$ and term $|b_G|^2$, where $b_G^t = -i_{s1} + \delta R s i_{s0} + \delta u_0$, ($i_{s1}$=first pseudo derivative of stator current)+$\delta R_s i_{s0} + \delta u_0$, $a'_G = i_{s2} + \gamma i_{s1} - \delta u_1$ ($i_{s2}$=second derivative of stator current)+$\gamma i_{s1} - \delta u_1$ (first pseudo derivative of stator voltage), J is the skew matrix $$\begin{pmatrix} 0 & -1 \\ 1 & 0 \end{pmatrix}.$$

4. The method and strategy set forth in claim 3 wherein slip gain is estimated using the step of computing the quotient of the term $b_G^t Ja'_G$ and the term $|b_G|^2$, where $b_G^t = -i_{s1} + \delta R_s i_{s0} + \delta u_0$, $a'_G = i_{s2} + \gamma i_{s1} - \delta u_1$.

5. The method and strategy set forth in claim 3 wherein the estimate of rotor speed comprises the step of obtaining a filtered current and a filtered voltage for the stator from which pseudo derivative values for stator current ($i_{s1}$) and voltage ($u_1$)

$$\left(\frac{d}{dt} + G\right)^2 i_{s0} = i_s, \quad \left(\frac{d}{dt} + G\right)^2 u_0 = u$$

$$i_{s1} = di_{s0}/dt, \quad i_{s2} = d^2 i_{s0}/dt^2, \quad u_1 = du_0/dt,$$

which are solutions of the following equations:

$$\left(\frac{d}{dt} + G\right)^2 i_{s1} = di_s/dt, \quad \left(\frac{d}{dt} + G\right)^2 u_1 = du/dt,$$

$$i_{s2} = i_s - 2G i_{s1} - G^2 i_{s0},$$

where u=stator voltage $u_0$=filtered stator voltage

G=filter constant $i_s$=stator current $i_{s0}$=filtered stator current $i_{s1}$=first pseudo derivative of stator current $i_{s2}$=second pseudo derivative of stator current, and $u_1$=first pseudo derivative of stator voltage.

6. The method and strategy set forth in claim 4 wherein the estimate of rotor speed comprises the step of obtaining a filtered current and a filtered voltage for the stator from which pseudo derivative values for stator current ($i_{s1}$) and voltage ($u_1$) respectively, are computed as follows:

$$\left(\frac{d}{dt} + G\right)^2 i_{s0} = i_s, \quad \left(\frac{d}{dt} + G\right)^2 u_0 = u$$

$$i_{s1} = di_{s0}/dt, \quad i_{s2} = d^2 i_{s0}/dt^2, \quad u_1 = du_0/dt,$$

which are solutions of the following equations:

$$\left(\frac{d}{dt} + G\right)^2 i_{s1} = di_s/dt, \quad \left(\frac{d}{dt} + G\right)^2 u_1 = du/dt,$$

$$i_{s2} = i_s - 2G i_{s1} - G^2 i_{s0},$$

where u=stator voltage $u_0$=filtered stator voltage

G=filter constant $i_s$=stator current $i_{s0}$=filtered stator current $i_{s1}$=first pseudo derivative of stator current $i_{s2}$=second pseudo derivative of stator current, and $u_1$=first pseudo derivative of stator voltage.

* * * * *